(12) United States Patent
Antani et al.

(10) Patent No.: US 8,538,404 B2
(45) Date of Patent: Sep. 17, 2013

(54) CENTRALLY MANAGING USER-SPECIFIED CONFIGURATION DATA FOR A CONFIGURABLE DEVICE

(75) Inventors: Snehal S. Antani, Hyde Park, NY (US); Frank J. DeGilio, Poughkeepsie, NY (US); Rajesh P. Ramachandran, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 12/402,726

(22) Filed: Mar. 12, 2009

(65) Prior Publication Data

US 2010/0234009 A1   Sep. 16, 2010

(51) Int. Cl.
*H04M 3/00* (2006.01)

(52) U.S. Cl.
USPC .......................................... 455/419; 455/418

(58) Field of Classification Search
USPC ................................. 455/418–420
See application file for complete search history.

(56) References Cited

U.S. PATENT DOCUMENTS

| | | | |
|---|---|---|---|
| 5,812,865 A | 9/1998 | Theimer et al. | |
| 6,453,162 B1* | 9/2002 | Gentry | 455/433 |
| 7,165,092 B2 | 1/2007 | Chang | |
| 7,925,245 B1* | 4/2011 | Soelberg et al. | 455/414.4 |
| 8,045,971 B2* | 10/2011 | Okkonen et al. | 455/419 |
| 2002/0022453 A1 | 2/2002 | Balog et al. | |
| 2006/0224619 A1 | 10/2006 | Kang et al. | |
| 2007/0167182 A1* | 7/2007 | Tenhunen et al. | 455/512 |
| 2007/0169093 A1* | 7/2007 | Logan et al. | 717/168 |
| 2008/0072299 A1* | 3/2008 | Reiher | 726/7 |
| 2008/0166993 A1* | 7/2008 | Gautier et al. | 455/405 |
| 2009/0037207 A1* | 2/2009 | Farah | 705/1 |
| 2009/0163175 A1* | 6/2009 | Shi et al. | 455/411 |
| 2009/0319848 A1* | 12/2009 | Thaper | 714/748 |

OTHER PUBLICATIONS

Cui, et al., "Seamless User-Level Handoff in Ubiquitous Multimedia Service Delivery", Multimedia Tools and Applications, vol. 22, No. 2, (Feb. 2004).
Nylander et al., "Ubiquitous Service Access Through Adapted User Interfaces on Multiple Devices", Per. Ubiquit. Computers, vol. 9, pp. 123-133 (2005).
Chalmers et al., "Map Adaptation for Users of Mobile Systems", Imperial College of Science, Technology and Medicine, Department of Computing (May 1-5, 2001).
Berhe et al., "Modeling Service-Based Multimedia Content Adaptation in Pervasive Computing", CF'04 (Apr. 14-16, 2004).

* cited by examiner

*Primary Examiner* — Jinsong Hu
*Assistant Examiner* — Magdi Elhag
(74) *Attorney, Agent, or Firm* — William A. Kinnaman, Esq.; Kevin P. Radigan, Esq.; Heslin Rothenberg Farley & Mesiti, P.C.

(57) ABSTRACT

A central configuration server is provided for managing user-specified configuration data for a configurable device. The central configuration server, which is separate from a configurable device to be configured, and which services a plurality of users, obtains a user identification and device information from the configurable device. Responsive to this, the central configuration server accesses an account database and uses the user identification and device information to retrieve, for the identified user, user-specified configuration data for the configurable device. The central configuration server then forwards the user-specified configuration data from the account database to the configurable device for use in automatically configuring the configurable device pursuant to the user-specified configuration data.

17 Claims, 7 Drawing Sheets

CENTRALLY MANAGING USER-SPECIFIED CONFIGURATION DATA FOR A CONFIGURABLE DEVICE

TECHNICAL FIELD

The present invention relates in general to managing user preferences or user-specified configuration data, and more particularly, to a method, computer system and computer program product for centralized management of user-specified configuration data for one or more configurable devices for a plurality of users.

BACKGROUND OF THE INVENTION

While today's media services and devices are becoming increasingly complex, the implementation of personalization technologies has lagged. Mobile phones, computers, digital media players and other service-ready media devices are currently access points to an increasingly diverse set of services. The assignment of personal identity and preferences for these devices, however, is conventionally performed via, and stored on a chip within, each device. In the example of a GSM mobile phone, these chips may be removable, but only by disassembling the phone. In many other devices, the identity or preferences as stored within the device are unavailable to the user except through the device. This means that the device has information about the user that is associated only with that device.

SUMMARY OF THE INVENTION

Briefly summarized, provided herein therefore, in one aspect, is a method of providing user-specified configuration data for a configurable device. The method includes: receiving by a configuration server a user identification and device information from a configurable device to be configured, the configuration server being separate from the configurable device and servicing a plurality of users; accessing by the configuration server an account database and using the user identification to retrieve, for the identified user, user-specified configuration data for the configurable device; and forwarding by the configuration server the user-specified configuration data from the account database to the configurable device for automatically configuring the configurable device pursuant to the user-specified configuration data.

In another aspect, a computer system is provided for facilitating providing of user-specified configuration data to a configurable device. The computer system includes a configuration server which is separate from the configurable device and which services a plurality of users. The configuration server, which accesses an account database comprising user-specified configuration data for the configurable device, includes a processor in communication with the account database. The computer system provides user-specified configuration data to the configurable device by: obtaining by the configuration server a user identification and device information from the configurable device to be configured; accessing by the configuration server the account database and using the user identification to retrieve for an identified user user-specified configuration data for the configurable device; and forwarding by the configuration server the user-specified configuration data from the account database to the configurable device for use in automatically configuring the configurable device pursuant to the user-specified configuration data.

In a further aspect, a computer program product is provided for facilitating providing user-specified configuration data to a configurable device. The computer program product includes a storage medium readable by a processing unit of a configuration server and storing instructions for execution by the processing unit for performing a method of providing user-specified configuration data for a configurable device, which is separate from the configuration server. The method includes: receiving by the configuration server the user identification and device information from the configurable device to be configured, the configuration server servicing a plurality of users; accessing by the configuration server an account database and using the user identification to retrieve, for the identified user, user-specified configuration data for the configurable device; and forwarding by the configuration server the user-specified configuration data from the account database to the configurable device for automatically configuring the configurable device pursuant to the user-specified configuration data.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1A:
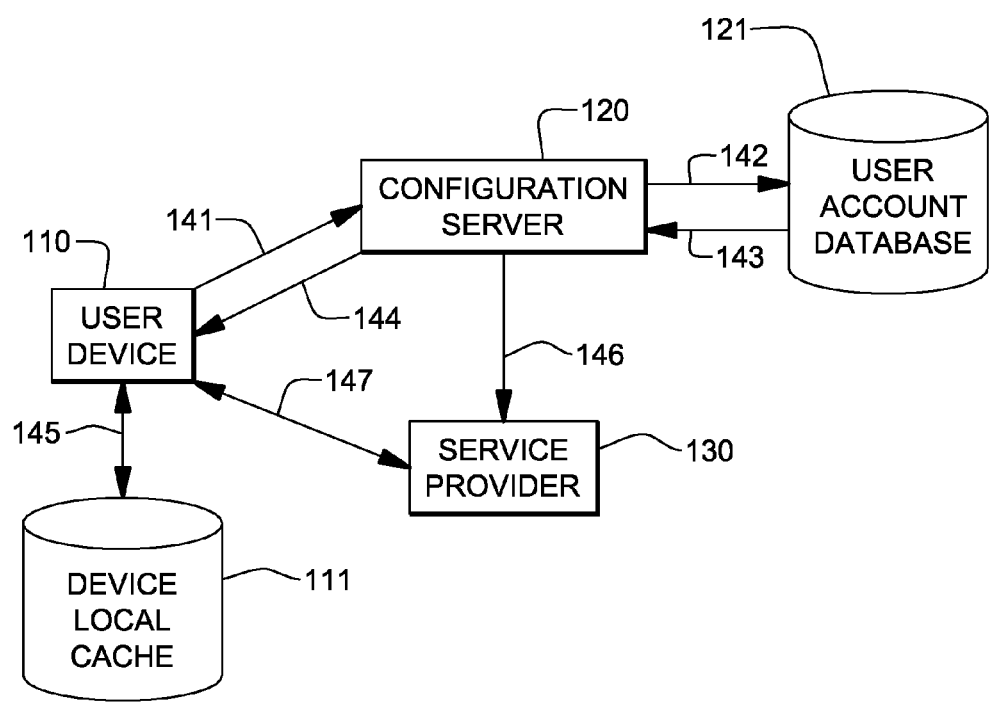
FIG. 1A is a diagram of one embodiment of a networked computer system and user-specified configuration data flow, in accordance with an aspect of the present invention.

As noted briefly above, in most configurable devices, the identity (or preferences) are stored within the device itself and are unavailable to the user except through the device. This has certain limitations. For example, since the configured device may have a relatively short life span, each new device has to be programmed with the user's preferences. This data tends to be repetitious and requires a certain amount of re-work by the user. Also, since device preferences are often stored within memory that may be lost when power is lost, the user may need to re-enter preferences after a power failure. In addition, while such devices provide a rich set of functions, the user interfaces are often limited by the available controls. Usability is typically limited by the capabilities of the device. Further, downloaded content is often licensed to the hardware, rather than to the user. Since the lifespan of certain hardware devices tends to be short, it makes transfer of media from one device to another device problematic. Since the user's identity and preferences are associated with a specific piece of hardware (or device), the user's ability to utilize services is diminished when separated from the device. For example, a user can only use a mobile phone service with a specific mobile phone today, or a video preference is only available to a user on a specific television channel controller or set top box, which was previously programmed by the user. As services converge, it would be desirable to be able to route configuration information automatically from one device to another device for a user. To accomplish this, described herein is a centralized system or server housing user-specified preferences or configuration data for one or more configurable devices.

Many of today's digital devices, such as a digital media device, have a network connection to a provider. The limitations of such devices are not in the ability to move the required data in and out of the device, but rather the limitation is in the thought that user data (such as preferences or user configuration data) should be tied to the device, rather than available at a centralized location. Likewise, the ability to manage user information across multiple devices is also possible, and the technology to secure the data and label it for correct usage and security exists. The present invention links these technologies.

In accordance with the present invention, when initially activated, a media device, such as a mobile phone or a channel controller, is provided with a user's identity. The device, which is assumed to be configurable, connects to a central configuration server, which in one embodiment comprises or can access a central account database, in order to retrieve user-specified configuration data (or preferences) appropriate to that configurable device. Once loaded, the configuration data can reside within the configurable device for a user-specified period of time, or until a predefined condition occurs. This time (or condition) could be defined by the user as part of the preferences or configuration data. The user's identity could be in the form of a user identification and password, or a more secure form of authentication, such as digital certificates, could be available via a secure media, such as a smart card, that connects to the configurable device. Since each user could have a different set of preferences (or configuration data), the cached identity could be replaced by another user's authenticating to the device. Thus, the same device could be serially, automatically configured for each different user, with each approved user overriding the preferences or configuration data of a prior user. As described further below, in the case of a mobile phone, this may also include reconfiguring the phone number service connection to that of the current user's number.

In one embodiment, the central account database (or user account database) has a wide range of preferences (or configuration data) for one or more configurable devices for a plurality of users. The database may be expandable to accommodate newer technologies, and provide the opportunity to copy configuration data from one device to another device of the same configurable device type. This allows an ability to abstract the user's preferences (or configuration data) beyond the specific device implementation. Thus, user and configuration data management services surround the central account database and provide the user with an ability to manage the user's identity and user-specified configuration data out of band with the configurable device (as described below with reference to FIGS. 2A & 2B).

Figure 1B:
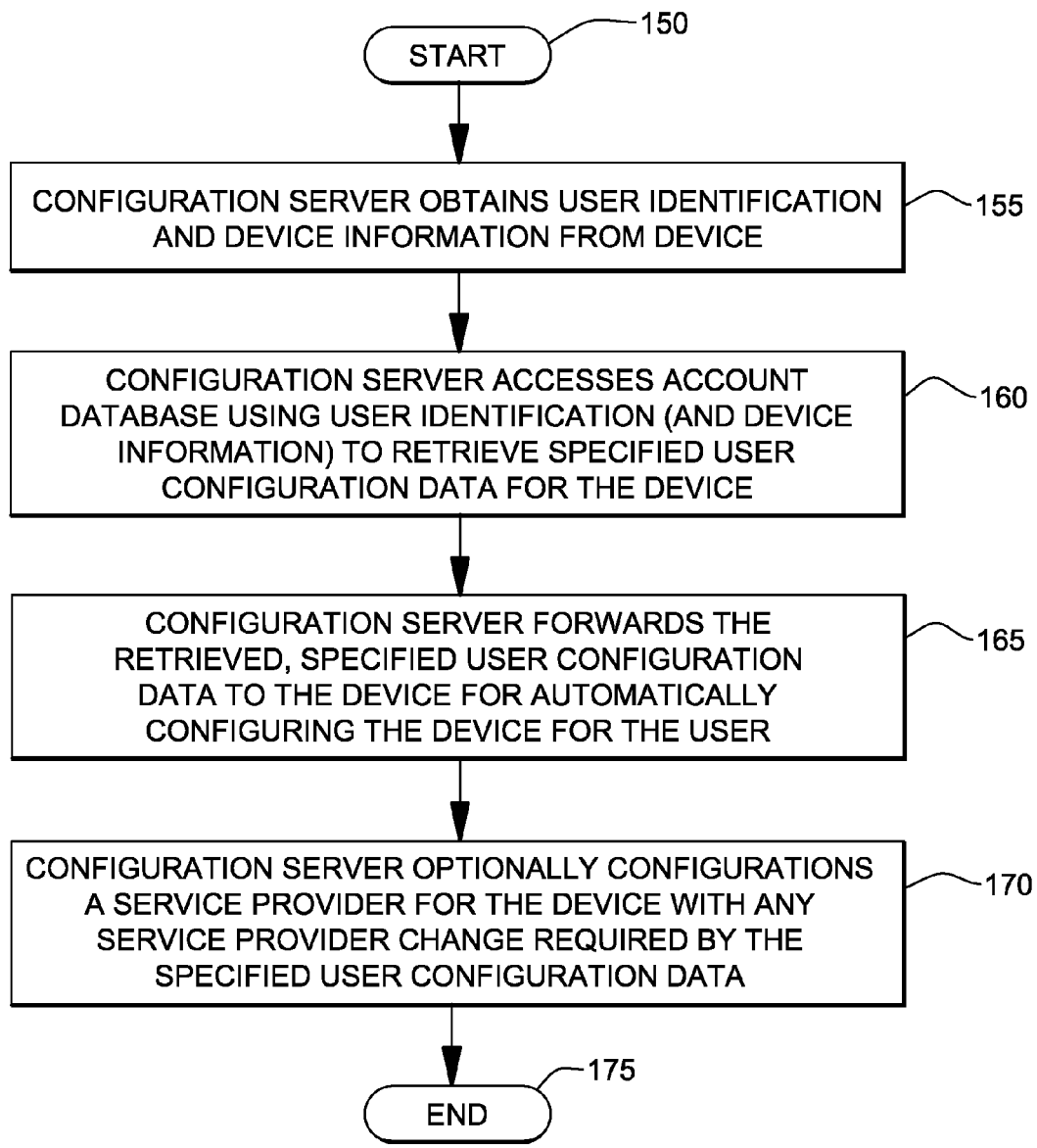
FIG. 1B is a flowchart of one embodiment of logic for a configuration server's centralized management of user-specified configuration data within a networked computer system such as depicted in FIG. 1A, in accordance with an aspect of the present invention.

Referring first to FIGS. 1A & 1B, which depict one embodiment of a networked computer system and user-specified configuration data flow, in accordance with an aspect of the present invention.

As shown in FIG. 1A, a configurable (user) device 110 receives or identifies a user identity or change in user identity or setup indicative of a new user. The configurable device initiates (STEP 150 in FIG. 1B) contact 141 with a central configuration (or contact) server 120 and provides user identification/authentication information and device information to the configuration server (STEP 155 in FIG. 1B). Authentication of a user's identity could be implemented using a number of different approaches. For example, a user could authenticate the user's identity on a configurable device by:

Supplying a user identification number and password, which would follow normal conventions that exist today for authentication.

Establishing a certificate based authentication. Network connected devices, whether wired or wireless, have the ability to store certificates. There are a number of technologies that currently exist that would facilitate the management of certificates to configurable devices. For example, secure digital cards or universal serial bus access could be employed. These digital certificates could then be unlocked by the appropriate user as an authentication mechanism.

Employing radio frequency identification (RFID) technology to identify the user or device. Providing devices that are keyed to specific RFID tags would facilitate identifying a particular user.

The above-noted examples of identification approaches allow a particular user to identify himself/herself to the configurable device. This identity could then be authenticated by the configuration server, with the configurable device being responsible for identifying the user forwarding the authentication credentials onto the configuration server, which then authenticates the identified user to access the relevant user-specified configuration data.

Central configuration server accesses 142 a user account database 121 associated with or in communication with the central configuration server in order to retrieve the user-specified configuration data for the configurable device. Access to the account database may employ the user identification (and optionally, the device information if more than one device type is recorded in the account database) (STEP 160 in FIG. 1B). The user account database 121 returns 143 the user-specified configuration data to the configuration server 120, which then forwards 144 the retrieved, user-specified configuration data to the configurable device 110, for use in automatically configuring itself using the user-specified configuration data (STEP 165 in FIG. 1B). Upon receipt, the configurable device 110 caches 145 the user-specified configuration data in a local cache 111 of the configurable device. The central configuration server optionally contacts 146 a third party service provider 130 providing service to the user's configurable device 110 in order to provide the third party service provider with any change required by the user-specified configuration data (STEP 170 in FIG. 1B). Assuming that the configurable device functions via the third party service provider 130, then an interaction 147 takes place as required by the user, utilizing normal device-to-service provider protocols, which completes the configuration data transfer flow (STEP 175 in FIG. 1B).

By way of specific example, the configurable user device may be any configurable device, such as a mobile phone, cable controller, automobile navigation system, or other automobile preference set apparatus, such as seating and wheel adjustments, radio settings and/or MP3 music, etc. Communication between the user device and the configuration server may be via RFID technology, Bluetooth technology or WIFI technology, etc. The Configuration Server could be implemented using an IBM WebSphere® Application Server with an application that recognizes the device request using one of multiple technologies like Session Initiation Protocol (SIP), Hypertext Transmission Protocol (HTTP) or a message queuing protocol. This software stack could be served on any IBM server hardware (System x®, System i®, System p®, or System z®) and could use Java Data Base Connectivity (JDBC) to connect to a database server like DB2® running on any IBM server hardware. (IBM®, WebSphere®, System x®, System i®, System p®, System z® and DB2® are registered trademarks of International Business Machines Corporation, Armonk, N.Y., USA. Other names used herein may be registered trademarks, trade names or product names of International Business Machines Corporation or other companies.) Further, the user account database may be associated directly with the configuration server, or may be accessed through a separate file system server, independent of the configuration server, but accessible by the configuration server.

Figure 2A:
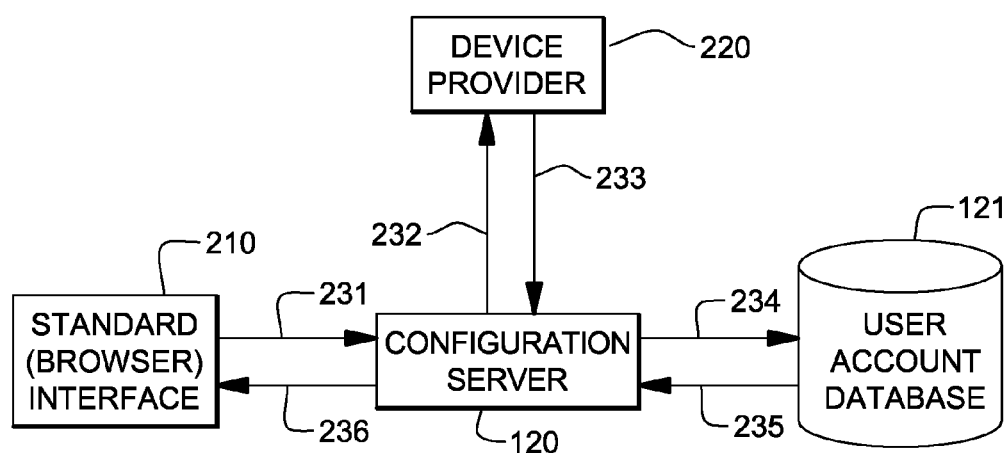
FIG. 2A is a diagram of one embodiment of a networked computer system for user's specifying of configuration data (or preferences) for centralized storage in a user account database, in accordance with an aspect of the present invention.
Figure 2B:
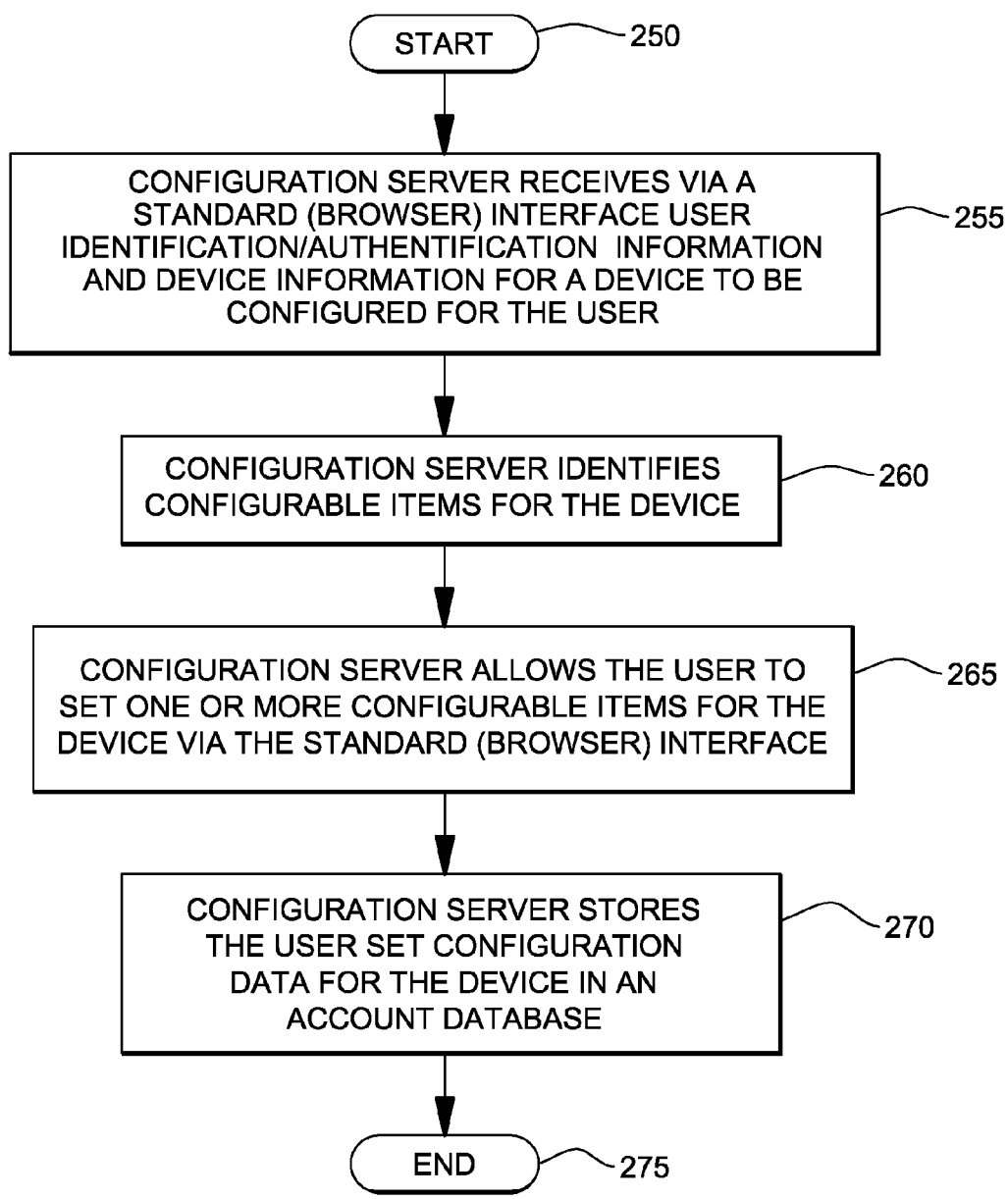
FIG. 2B is a flowchart of one embodiment of logic for a configuration server for facilitating a user's specification of configuration data for storage in a user account database, in accordance with an aspect of the present invention.

Since configuration data is maintained in the example of FIGS. 1A & 1B in a user account database and accessible through a central configuration server, the configuration data (or preferences) reside external to the device at issue, and the data can therefore be managed without using the configurable device directly. This is illustrated in the example of FIGS. 2A & 2B, which depict one embodiment of the interaction between a user and the central configuration server in order to manage user-specified configuration data for a configurable device. The pre-specifying data flow begins (STEP 250 in FIG. 2B) with a user employing a standard interface 210 (FIG. 2A), such as a standard browser interface, to log into 231 the central configuration (or contact) server 120. The login process may include the user forwarding identification and/or authentication information and information identifying the specific configurable device(s) for which preferences or user-specified configuration data are to be stored (STEP 255 in FIG. 2B). In the embodiment illustrated, the central contact server 120 contacts 232 a third party device provider 220 to retrieve a list of configurable items for the configurable device 233. More generally, as noted in FIG. 2B, the central contact server could identify configurable items for the device at issue by retrieving a pre-stored list of configurable items for the particular configurable device. Thus, STEP 260 in FIG. 2B generally states that the configuration server identifies configurable items for the device at issue.

Continuing with FIG. 2A, once the central configuration server has allowed (STEP 265 in FIG. 2B) the identified user to manipulate the configuration settings or items (provided, for example, by the third party device provider 220) the preferences (or user-specified configuration data) are stored 234 in a user account database 121, which as noted above, may contain preferences for a plurality of users for either a single device type, or a plurality of device types (STEP 270 in FIG. 2B). The central configuration server 120 is informed 235 once the user-specified configuration data has been stored in user account database 121, which returns the stored status 236 back to the user via the standard interface 210, which completes the pre-specifying configuration data flow (STEP 270 in FIG. 2B).

From the above discussion, it will be observed that once the initial information has been provided to the user account database, the user can manipulate settings for the configurable device without interaction with the third party device provider, which in this example, is assumed to be a different entity than the central configuration server. Specifically, in one implementation, the third party device provider is a separate, independent entity from the central configuration server, or service provider maintaining the central configuration server. The central configuration server may be in communication with a third party device provider in order to obtain periodic updates on the configurable items for particular types or classes of configurable devices for which user-specified configuration data is to be maintained. In the examples provided herein the configurable server may be part of a configuration service provider, which is independent from both the third party service provider and the third party device provider. With some intelligence, the central configuration server could be able to migrate performance settings from device to device. Standardized protocols that define such interaction would be advantageous to all providers. Today, many computer devices have LDAP-based models for manipulating configuration data. Thus, configurations for such devices could benefit from such a model.

Figure 3A:
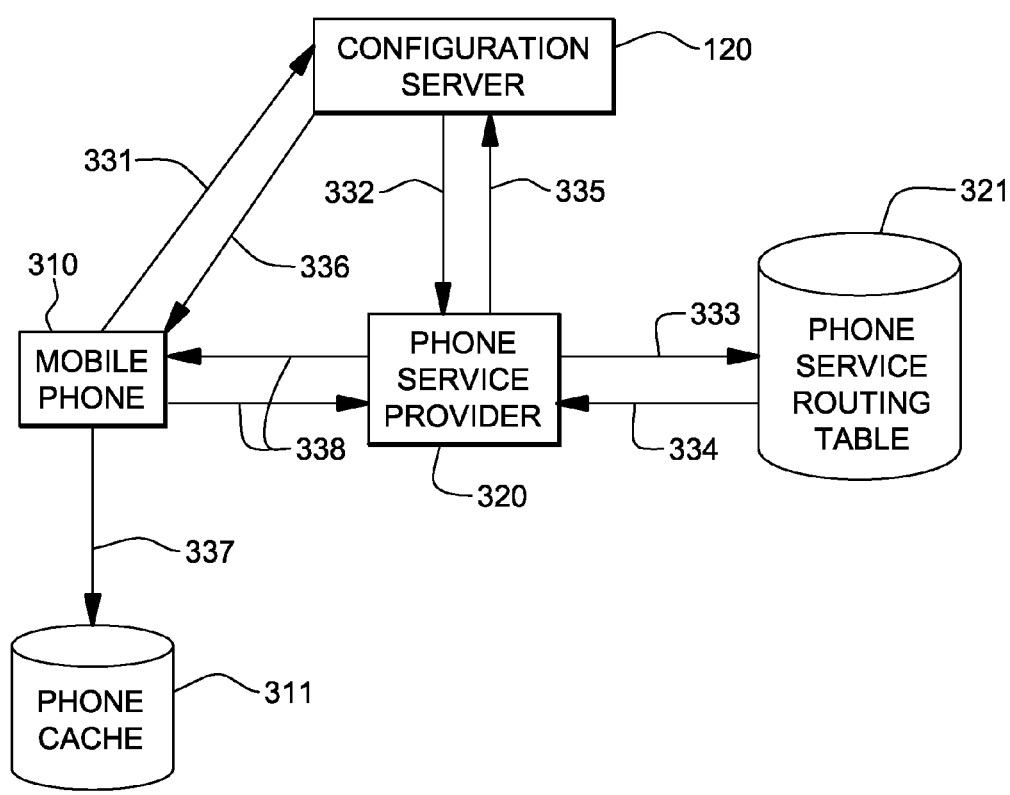
FIG. 3A is a diagram of one embodiment of a networked computer system wherein a mobile phone interacts with a central configuration server for automatically configuring the mobile phone with user-specified configuration data, in accordance with an aspect of the present invention.
Figure 3B:
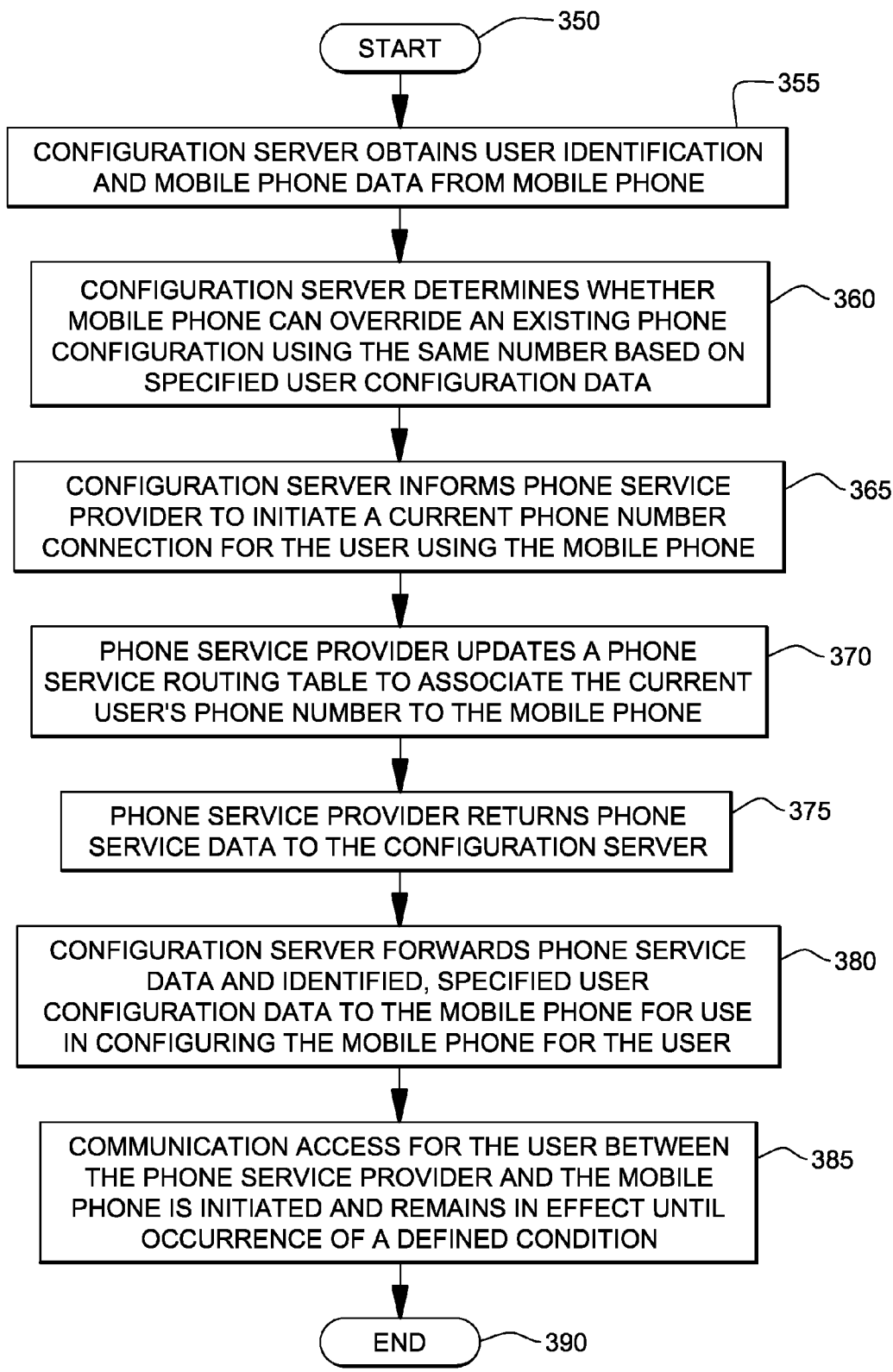
FIG. 3B is a flowchart of one embodiment of logic for automatically configuring a mobile phone employing a networked computer system such as depicted in FIG. 3A, in accordance with an aspect of the present invention.

While many device settings and interactions could be straightforward, others may be more complex. The inventive concepts disclosed herein also support a more complex relationship between the configurable device and the service provider(s). Consider, for example, the mobile phone embodiment of FIGS. 3A & 3B. As illustrated by FIG. 3A, a mobile phone starts (STEP 350 in FIG. 3B) the configuration process by forwarding 331 user identification and mobile phone data from the mobile phone to a central configuration server 120 (STEP 355 in FIG. 3B) maintained by a configuration service provider. In the case of a user identity owning more than one phone number, the user must also specify the phone number that this particular mobile phone is using or is to use. User preferences will determine whether the mobile phone can or cannot override an existing phone configuration for the phone number at issue (STEP 360 in FIG. 3B). The central configuration server 120 informs 322 a third party phone service provider 320 to initiate a new or updated service connection for the user using the mobile phone with the currently provided phone number (STEP 365 in FIG. 3B). The third party phone service provider 320 updates 333 service connection information in the phone service routing table or database 321 to associate the current user's phone number with the mobile phone (STEP 370 in FIG. 3B). The assumption here is that the mobile phone device has a unique identifier, such as the MAC address used by computers, or an LDAP distinguished name, which identifies the mobile phone separate from the phone number associated with the device. Once the phone service routing table 321 has been successfully updated, the phone service provider 320 is informed 334 of the change. The third party phone service provider 320 then returns any specific phone service data information that the mobile phone will need back to the central configuration server 120 (STEP 375 in FIG. 3B). Central configuration server 120 then returns 336 the phone service provided data, as well as any user-specific settings for that mobile phone device (for example, phone numbers, calendar entries, etc.) to mobile phone 310 for use in automatically configuring the mobile phone for the user (STEP 380 in FIG. 3B). A service connection 338 is then established between mobile phone 310 and third party service provider 320, and the mobile phone service connection stays in force until occurrence of a predefined condition (STEP 385 in FIG. 3B), which completes the mobile phone configuration data flow (STEP 390 in FIG. 3B).

The predefined condition for terminating the service connection between the mobile phone and the third party service provider, or terminating the user-specified configuration data on the mobile phone, can vary. For example, the predefined condition might comprise:

Expiration of a session limit imposed by the central configuration server. Under this scenario, the third party phone service provider ceases to recognize the communications session or service connection after expiration of the time limit.

An inactivity limit between the third party service provider and the mobile phone being reached. Again, this could be based on settings provided by the central configuration server at setup time. Inactivity could be based on a lack of communication between the mobile phone and the phone service provider, as in the case of a lost signal, or if communication has not been lost, where the phone has not been used.

Logging off of the identified user of the mobile phone from the communications session or from the service provider, which clears the user-specified configuration settings from the mobile phone cache, and removes the user's service connection entry in the routing table for the service provider.

The mobile phone authenticating with another user. If the mobile phone is powered off and its cache has been cleared, the mobile phone may go through the authentication process again, or if the phone is provided to another user, the log-on event may clear the phone's cache and initiate a new session with the phone service provider, or another service provider.

Although described principally above with reference to the configurable device being a mobile phone, those skilled in the art will note that the concepts presented herein are applicable to many different configurable devices. For example, the configurable device might be a set top box, such as a cable box. In this case, a customer could be at another's house or at a hotel room and automatically have their cable and pay-per-view preferences available there, as well as have any pay-per-view charges automatically billed to their account. In another implementation, an automobile with WiFi capability could be the configurable device. For example, if the automobile has the ability to recognize a user (such as by RFID or some other technology), preferences such as seat, wheel and pedal adjustments could be made for the user, even it if is the first time that the driver has used the car. Additionally, readouts (MPH vs KMPH, driving statistics, MPG, etc.), favorite locations on the automobile's GPS, or other settings that match the driver's preferences, could be automatically configured.

To summarize, service providers today typically dictate hardware for users to use. The concepts presented herein separate the devices from the service providers, allowing the device to access multiple providers, with multiple personalities or user-specified configuration data. This provides the device with independence and allows users to buy devices based on their own merit, with service providers no longer being able to dictate which devices are used or what limitations could be assigned to them. Additionally, with the concepts presented herein, user preferences transcend a particular device and are universally supportable across different hardware platforms.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 4:
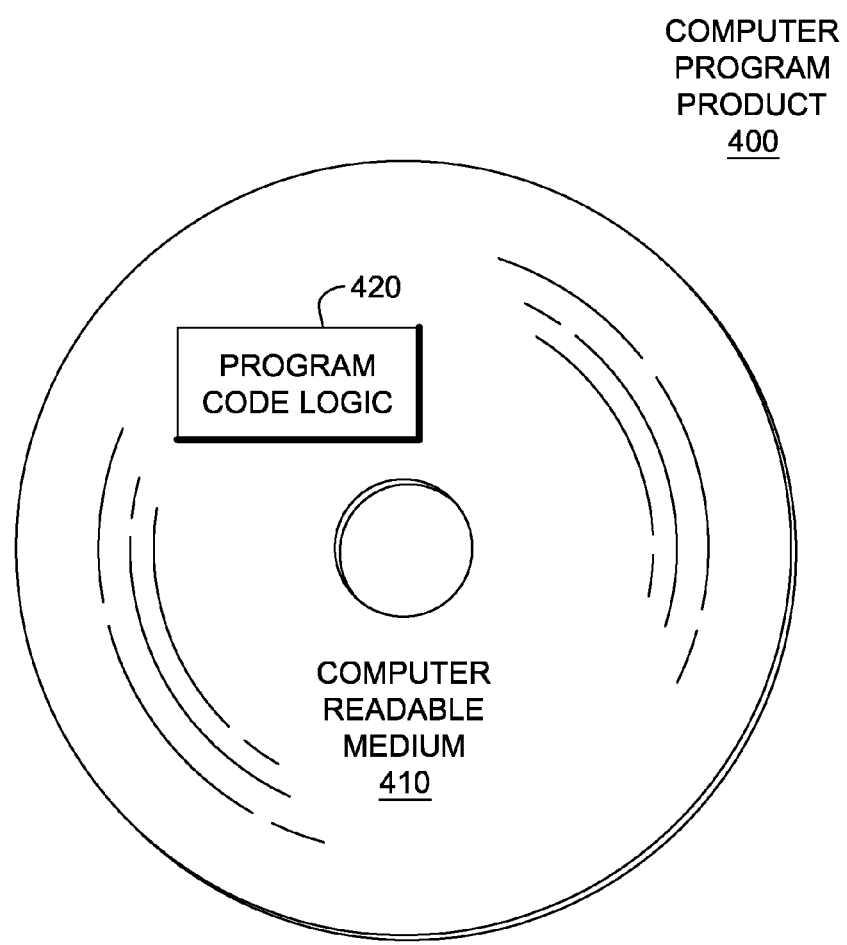
FIG. 4 depicts one embodiment of a computer program product or article of manufacture incorporating one or more aspects of the present invention.

One example of an article of manufacture or a computer program product incorporating one or more aspects of the present invention is described with reference to FIG. 4. A computer program product 400 includes, for instance, one or more computer-readable media 410 to store computer readable program code means or logic 420 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code can be used, which includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

As used herein, the term "obtaining" includes, but is not limited to, receiving, fetching, having, providing, being provided, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for configuring a user-configurable device, the method comprising:
    providing user-prespecified configuration preferences to a user-configurable device, the providing comprising:
    obtaining user-prespecified configuration preferences and storing the user-prespecified configuration preferences in an account database accessible by a configuration server, the user-prespecified configuration preferences comprising at least one service change required by a third party service provider to the user-configurable device, the third party service provider being separate from the configuration server, and the user-configurable device employing a service of the third party service provider;
    receiving by the configuration server an individual user's identification from the user-configurable device to be configured, the configuration server being separate from the user-configurable device and servicing a plurality of users, and the individual user's identification identifying the individual user of the user-configurable device of the plurality of users;
    accessing by the configuration server the account database and using the individual user's identification to retrieve, for the identified user, that user's user-prespecified configuration preferences for use in configuring the user-configurable device;
    forwarding by the configuration server the retrieved, user-prespecified configuration preferences from the account database to the user-configurable device for use in automatically configuring the user-configurable device pursuant to the user-prespecified configuration preferences; and
    automatically contacting by the configuration server the third party service provider to the user-configurable device with the at least one service change required by the third party service provider pursuant to the retrieved, user-prespecified configuration preferences forwarded to the user-configurable device, and implementing via the third party service provider the at least one service change required pursuant to the retrieved, user-prespecified configuration preferences.

2. The method of claim 1, wherein the obtaining comprises receiving via a standard interface, separate from the user-configurable device and in communication with the configuration server, the user-prespecified configuration preferences for the user-configurable device.

3. The method of claim 2, wherein the configuration server, responsive to a request from the standard interface to specify configuration preferences for the user-configurable device, obtains information on configurable items for the user-configurable device as specified by a third party device provider, and the configuration server allows one or more configurable items for the user-configurable device to be set via the standard interface by the identified user to produce the user-prespecified configuration preferences, wherein the configuration server subsequently stores the user-prespecified configuration preferences for the user-configurable device in the account database.

4. The method of claim 1, wherein the providing further comprises caching the forwarded, user-prespecified configuration preferences within the user-configurable device, and if present, overriding any previous configuration preferences for a different user of the user-configurable device.

5. The method of claim 1, wherein the user-configurable device is a mobile phone and the third part service provider is a third party phone service provider, and wherein the configuration server further determines whether the mobile phone can override an existing phone number service connection for a pre-existing user of the mobile phone based on user-prespecified configuration preferences, and if so, the configuration server automatically informs the third party phone service provider to initiate a new phone number service connection for the identified individual user of the mobile phone, the third party phone service provider responding thereto by updating a phone service routing database to automatically associate the identified individual user's phone number to the mobile phone, and the third party phone service provider providing phone service data to the configuration server responsive thereto.

6. The method of claim 5, wherein the configuration server forwards the phone service data to the mobile phone for use in automatically configuring the mobile phone pursuant to the user-prespecified configuration preferences, and wherein communication access for the identified individual user between the third party phone service provider and the mobile phone, using the new phone number service connection is automatically initiated and remains in effect until occurrence of a predefined condition.

7. A computer system for facilitating configuring a user-configurable device, the computer system comprising:
    a configuration server separate from the user-configurable device and separate from a third party service provider to the user-configurable device, the configuration server servicing a plurality of users, and comprising:
    an account database comprising user-prespecified configuration preferences of at least one user of the plurality of users for the user-configurable device, the user-prespecified configuration preferences comprising at least one service charge required by the third party service provider to the user-configurable device; and a processor in communication with the account database, wherein the computer system facilitates configuring the user-configurable device by:
   obtaining by the configuration server an individual user's identification from the user-configurable device to be configured;
   accessing by the configuration server the account database and using the individual user's identification to retrieve, for the identified user, user-prespecified configuration preferences of the at least one user stored for the user-configurable device;
   forwarding by the configuration server the retrieved, user-prespecified configuration preferences from the account database to the user-configurable device for use in automatically configuring the user-configurable device pursuant to the user-prespecified configuration preferences; and
   automatically contacting by the configuration server the third party service provider to the user-configurable device with the at least one service change required by the third party service provider pursuant to the retrieved, user-prespecified configuration preferences forwarded to the user-configurable device, and implementing via the third party service provider the at least one service change required pursuant to the retrieved, user-prespecified configuration preferences.

8. The computer system of claim 7, further comprising pre-specifying by the identified individual user the user-prespecified configuration preferences to the configuration server for storage in the account database, the pre-specifying including receiving via a standard interface, separate from the user-configurable device and in communication with the configuration server, the user-prespecified configuration preferences for the user-configurable device.

9. The computer system of claim 8, wherein the configuration server, responsive to a request from the standard interface to specify configuration preferences for the user-configurable device, obtains information on configurable items for the user-configurable device as specified by a third party device provider, and the configuration server allows one or more configurable items for the configuration server to be set via the standard interface by the identified individual user to produce the user-prespecified configuration preferences, wherein the configuration server subsequently stores the user-prespecified configuration preferences for the user-configurable device in the account database.

10. The computer system of claim 7, wherein the forwarding comprises caching the user-prespecified configuration preferences within the user-configurable device, and if present, overriding any previous configuration preferences for a different individual user of the user-configurable device.

11. The computer system of claim 7, wherein the user-configurable device is a mobile phone and the third party service provider is a third party phone service provider, and wherein the configuration server further determines whether the mobile phone can override an existing phone number service connection for a pre-existing user of the mobile phone based on user-prespecified configuration preferences, and if so, the configuration server automatically informs the third party phone service provider to initiate a new phone number service connection for the identified user of the mobile phone, the third party phone service provider responding thereto by updating a phone service routing database to automatically associate the identified individual user's phone number to the mobile phone, and the third party phone service provider providing phone service data to the configuration server responsive thereto.

12. The computer system of claim 11, wherein the configuration server forwards the phone service data to the mobile phone for use in automatically configuring the mobile phone pursuant to the user-prespecified configuration preferences, and wherein communication access for the identified individual user between the third party phone service provider and the mobile phone using the new phone number service connection is automatically initiated and remains in effect until an occurrence of the predefined condition.

13. A computer program product to facilitate configuring a user-configurable device, the computer program product comprising:
   a non-transitory storage medium readable by a processing unit of a configuration server and storing instructions for execution by the processing unit for performing a method of configuring a user-configurable device, which is separate from the configuration server, the method comprising:
   obtaining user-prespecified configuration preferences and storing the user-prespecified configuration preferences in an account database accessible by a configuration server, the user-prespecified configuration preferences comprising at least one service change required by a third party service provider to the user-configurable device, the third party service provider being separate from the configuration server, and the user-configurable device employing a service of the third party service provider;
   receiving by the configuration server an individual user's identification from the user-configurable device to be configured, the configuration server being separate from the user-configurable device and servicing a plurality of users, and the individual user's identification identifying the individual user of the user-configurable device of the plurality of users;
   accessing by the configuration server the account database and using the individual user's identification to retrieve, for the identified user, that user's user-prespecified configuration preferences for use in configuring the user-configurable device;
   forwarding by the configuration server the retrieved, user-prespecified configuration preferences from the account database to the user-configurable device for use in automatically configuring the user-configurable device pursuant to the user-prespecified configuration preferences; and
   automatically contacting by the configuration server the third party service provider to the user-configurable device with the at least one service change required by the third party service provider pursuant to the retrieved, user-prespecified configuration preferences forwarded to the user-configurable device, and implementing via the third party service provider the at least one service change required pursuant to the retrieved, user-prespecified configuration preferences.

14. The computer program product of claim 13, wherein the obtaining comprises receiving via a standard interface, separate from the user-configurable device and in communication with the configuration server, the user-prespecified configuration preferences for the user-configurable device.

15. The computer program product of claim 14, wherein the configuration server, responsive to a request from the standard interface to specify configuration preferences for the user-configurable device, obtains information on configurable items for the user-configurable device as specified by a third party device provider, and the configuration server allows one or more configurable items for the user-configurable device to be set via the standard interface by the identified individual user to produce the user-prespecified configuration preferences, wherein the configuration server subsequently stores the user-prespecified configuration preferences for the user-configurable device in the account database.

16. The computer program product of claim 13, wherein the user-configurable device is a mobile phone and the third party service provider is a third party phone service provider, and wherein the configuration server further determines whether the mobile phone can override an existing phone number service connection for a pre-existing user of the mobile phone based on user-prespecified configuration preferences, and if so, the configuration server automatically informs the third party phone service provider to initiate a new phone number service connection for the identified user of the mobile phone, the third party phone service provider responding thereto by updating a phone service routing database to automatically associate the identified individual user's phone number to the mobile phone, and the third party phone service provider providing phone service data to the configuration server responsive thereto.

17. The computer program product of claim 16, wherein the configuration server forwards the phone service data, to the mobile phone for use in automatically configuring the mobile phone pursuant to the user-prespecified configuration preferences, and wherein communication access for the identified individual user between the third party phone service provider and the mobile phone, using the new phone number service connection is automatically initiated and remains in effect until occurrence of a predefined condition.

* * * * *